United States Patent [19]
Hata

[11] 3,857,148
[45] Dec. 31, 1974

[54] METHOD OF ASSEMBLING A FULL TYPE BALL BEARING

[76] Inventor: Toshio Hata, 14-403, No. 11, 1-chome, Denenchofu, Ohta-ku, Tokyo, Japan

[22] Filed: Nov. 6, 1973

[21] Appl. No.: 413,383

[30] Foreign Application Priority Data
Jan. 20, 1973 Japan.................................. 48-8284

[52] U.S. Cl........................................... 29/148.4 A
[51] Int. Cl............................................. B23p 11/00
[58] Field of Search......... 29/148.4 A, 148.4 R, 201, 29/148.4 C

[56] References Cited
UNITED STATES PATENTS
1,907,015 5/1933 Swart............................ 29/148.4 A
1,982,932 12/1934 Scribner......................... 29/148.4 A Primary Examiner—Thomas H. Eager
Attorney, Agent, or Firm—Fred Philpitt; W. Robert Baylor

[57] ABSTRACT

A method of making a ball bearing device in which a thermoplastic resin ring body is produced by enclosing in the ring-like body a selective number of grease embedded balls with a thermoplastic resin film. This thermoplastic resin ring body is rotatably mounted on a track of the races of a bearing. The friction generated by the rotative force at the ball contacted tract surface of the races with the thermoplastic resin ring body causes a rupture therein, whereby the grease embedded balls are set at their proper operative positions in the races.

2 Claims, 9 Drawing Figures

METHOD OF ASSEMBLING A FULL TYPE BALL BEARING

BACKGROUND OF THE INVENTION

This invention relates to ball bearing assemblies and more particularly to a method of making a ball bearing assembly in which the ball bearing containing ring unit is formed of a plastic material.

In assembling a full type ball bearing structure, it has been difficult, particularly under adverse conditions such as the cold temperatures of winter to accurately and rapidly determine the required number of balls and quantity of grease to be utilized in the structural assembly thereof. As a general rule, only a technician with considerable experience and skill can make a rapid assembly. For this reason, special type assembling devices have been developed, but such devices are expensive and are not practical for many purposes.

SUMMARY OF THE INVENTION

The present invention has been conceived to solve the foregoing problems and relates to a method of making a ball bearing assembly of the type described above which is economical and simple in construction, and yet provides a high quality commericial product.

The utilization of a thermoplastic resin ring body between races of a bearing operatively provides limited universal movement between the races; for example, to compensate for misalignment of a rotating rod element supported therein.

The present invention is directed to the method of assembling a full type ball bearing device which comprises the steps of: covering a ring like arrangement of a required quantity of grease and a required number of balls embedded in the grease with a thermoplastic resin film to form a thermoplastic resin ring body; mounting the thermoplastic resin ring body between races of a bearing; rotating the bearing; the rotative force rupturing the resin film of the thermoplastic resin ring body by the friction produced by the ball contacted tract surfaces of the races with the thermoplastic resin ring body and thus disposing the grease embedded balls in selective operative locations in the bearing races.

DESCRIPTION OF THE PREFERRED EMBODIMENTS

Figure 1:
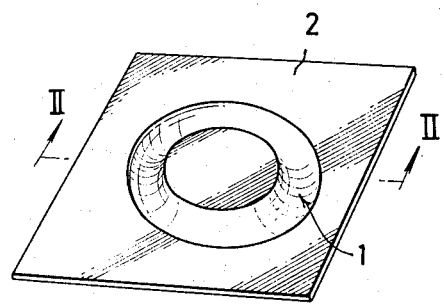
FIG. 1 is a perspective view of a thermoplastic resin plate having a cylindrical groove therein prior to formation of the ball bearing assembly according to the present invention.
Figure 2:
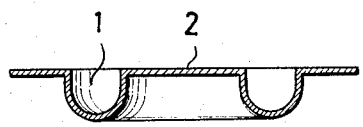
FIG. 2 is a cross sectional view taken along line II—II of Fig. 1.
Figure 3:
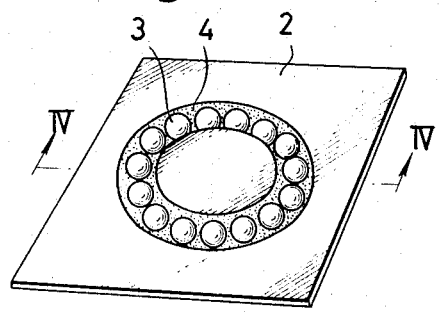
FIG. 3 is a perspective view in which the balls and grease are filled in the groove of the thermoplastic resin plate of Fig. 1.
Figure 4:
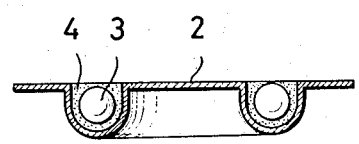
FIG. 4 is a cross sectional view taken along line IV—IV of FIG. 3.

Referring to FIGS. 1-4, there is shown a semi-cylindrical shaped ring groove 1 formed by vacuum molding or press molding in a flat thermoplastic resin plate 2. As shown in FIGS. 3 and 4, a predetermined number of balls 3 are embedded in a predetermined number of balls 3 are embedded in a predetermined quantity of grease 4 and the grease embedded balls 3 are positioned in selective operative locations in the ring or annular groove 1.

Figure 5:
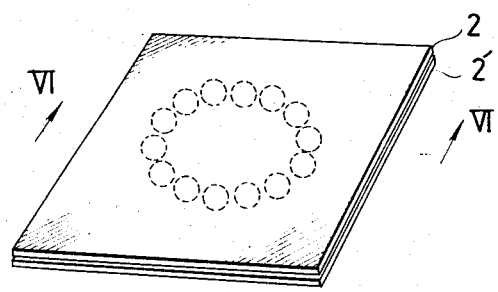
FIG. 5 is a perspective view illustrating two thermoplastic resin plate units of FIG. 3 in a superimposed condition and the ball bearings thereof in dotted lines.
Figure 6:
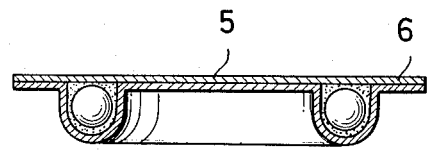
FIG. 6 is a cross sectional view taken along line VI—VI of FIG. 5.
Figure 7:
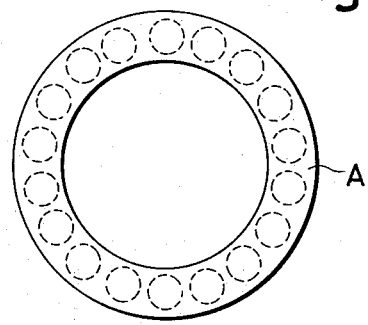
FIG. 7 is a top plan view of a complete thermoplastic resin ring body unit and the ball bearings thereof in dotted lines.

With reference to FIGS. 5 and 6, a flat thermoplastic resin plate 2' similar to thermoplastic resin plate 2, but devoid of the annular groove, is placed on top of the thermoplastic resin plate to sandwich the grease embedded balls therebetween. At the same time, the thermoplastic resin plates 2, 2' are bonded together by suitable means. Thereafter, a central portion 5 and an external peripheral portion 6 are cut off whereby a grease embedded ball ring body; namely, a thermoplastic resin ring body A as shown in FIG. 7 is formed.

Figure 8:
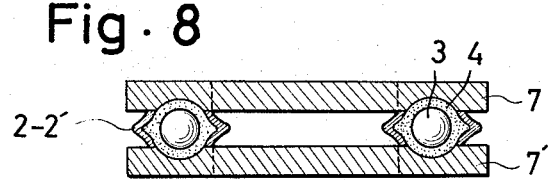
FIG. 8 is a cross sectional view of the unit of FIG. 7.

The ring body A is then rotatably mounted at the proper position between upper and lower race members 7, 7' of a thrust -ball bearing as shown in Fig. 8. The rotative force ball in the thermoplastic resin plates 2, 2' ruptured or fractured areas which are caused by the friction produced at the contact tract surface of the races and the ring body whereby the grease embedded balls are set at the proper positions in the races. The resulting ruptured thermoplastic resin plate unit 2, 2' is pushed out at its periphery as shown in Fig. 8 and thereby the unit acts as a dust seal.

Figure 9:
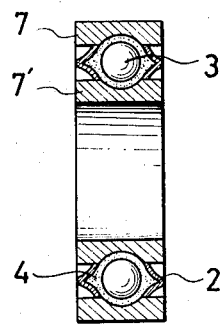
FIG. 9 is a cross sectional view similar to FIG. 8, but illustrating another embodiment.

FIG. 9 shows another embodiment of the present invention in which the concept is applied to an inclined contact type ball bearing device, wherein identical symbols are attached to elements identical to the previous embodiment. The thermoplastic resin ring body A is made by inserting a required number of grease embedded balls into a tubular member made of thermoplastic resin and is bonded to both ends of the tubular member by suitable means in lieu of sandwiching the grease embedded balls between two sheets of grooved plates as disclosed in the previous embodiment. As described in the foregoing, according to the present invention, the required number of balls and quantity of grease are determined beforehand and then placed in the ring body. Thus, there is no need in counting the number of balls or weighing the grease on the jobsite of assembly, and as compared with the conventional method of inserting the balls and grease for a full type ball bearing device, the balls and grease are not caused to be moved out of place. Also, the number of balls and the quantity of grease can be accurately and easily handled without unnecessary skill, and yet the cost of the present invention is low, particularly in case of mass production of similar constructed ball bearing devices. Moreover, it is to be noted that the application of the resin film to a thrust bearing serves the purpose fo a dust sealing means. Further, it has been found that the utilization of thermoplastic resin, polyethylene or polystyrene whose film is about 0.01 to 0.015 is preferable in the practice of the invention.

What is claimed is:

1. A method of assembling a full type ball bearing device which comprises the steps of:

covering a ring like arrangement of a required quantity of grease and a required number of balls embedded in the grease with a thermoplastic resin film to form a thermoplastic resin ring body; mounting the thermoplastic resin ring body between races of a bearing, rotating the bearing; the rotative force generating a frictional effect at the contact track surfaces of the races with the thermoplastic resin ring body and rupturing the resin film of the thermoplastic resin ring body and thus disposing the grease embedded balls in selective operative locations in the bearing races.

2. The method of making a ball bearing structure comprising the steps of:

forming by molding an annular groove in thermoplastic resin plate members; inserting a selective number of ball elements embedded in a selective quantity of grease to fill said annular groove; cutting off the central and external peripheral portions of said thermoplastic resin plate members surrounding said annular groove to form a ring unit; mounting said ring unit between upper and lower races of thrust bearing elements; rotating said bearing elements; the rotative force generating a frictional effect at the ball contacted track surface of the races with the thermoplastic resin ring body, rupturing the resin film of the thermoplastic resin ring body, and disposing the grease embedded ball elements in selective operative locations between said bearing races.

* * * * *